United States Patent [19]
Tsutsumi

[11] Patent Number: 4,995,938
[45] Date of Patent: Feb. 26, 1991

[54] SUPPORTING DEVICE FOR ULTRASONIC VIBRATION ASSEMBLY

[75] Inventor: Kiyohide Tsutsumi, Aichi, Japan

[73] Assignee: Mitsubishi Denki Kabushiki Kaisha, Tokyo, Japan

[21] Appl. No.: 387,922

[22] Filed: Aug. 1, 1989

[30] Foreign Application Priority Data

Aug. 4, 1988 [JP] Japan ................................ 63-195226

[51] Int. Cl.[5] ................................ B29C 65/08
[52] U.S. Cl. ................................ 156/580.1; 228/1.1
[58] Field of Search ................ 156/580.1, 580.2, 73.1, 156/580; 228/1.1; 425/174.2

[56] References Cited

U.S. PATENT DOCUMENTS

| | | | |
|---|---|---|---|
| 3,586,589 | 6/1971 | Jugler | 156/580.1 |
| 4,534,819 | 8/1985 | Payet et al. | 156/580.2 |
| 4,647,336 | 3/1987 | Coenen et al. | 156/580.1 |

FOREIGN PATENT DOCUMENTS

| | | |
|---|---|---|
| 59-161254 | 9/1984 | Japan . |
| 61-76261 | 4/1986 | Japan . |

*Primary Examiner*—Michael G. Wityshyn
*Attorney, Agent, or Firm*—Sughrue, Mion, Zinn, Macpeak & Seas

[57] ABSTRACT

A device for supporting an ultrasonic vibration assembly comprises an ultrasonic vibrator, a vibration transmitter coupled to the end of the vibrator coaxially thereto, two flanges provided at a prescribed distance from each other on the outside circumferential surface of the transmitter so as to act as pistons, a cylinder in which the flanges are fitted so as to be movable in the axial direction of the cylinder, and mechanisms for feeding a pressurized fluid to two openings defined between the flanges and both the ends of the cylinder. The cross-sectional area of one portion of the interior of the cylinder is made different from that of the portion of the opening, and one of the flanges is made different in outside diameter from the other thereof and fitted in the end portion.

10 Claims, 3 Drawing Sheets

SUPPORTING DEVICE FOR ULTRASONIC VIBRATION ASSEMBLY

BACKGROUND OF THE INVENTION

The present invention relates to a device for supporting an ultrasonic vibration assembly including an ultrasonic vibrator and an ultrasonic vibration transmitter coupled to the vibrator.

FIG. 2 is a longitudinally sectional view of a device for supporting an ultrasonic vibration assembly, which was disclosed in Japanese patent application Kokai No. 63-193699 owned by the same assignee and published on Aug. 10, 1988.

In FIG. 2, an ultrasonic vibrator 1 generates ultrasonic vibration and is shaped as a column. An ultrasonic vibration transmitter 2 is coupled to the bottom of the ultrasonic vibrator 1 coaxially thereto. A tool 3 is coupled to the bottom of the transmitter 2 so as to perform machining by using ultrasonic vibration. Flanges 4a and 4b, which function as pistons, are provided on the outside circumferential surface of the transmitter 2 near the top and bottom thereof integrally with the transmitter. A cylinder 5 includes the flanges 4a and 4b so that the flanges are slidable up and down in the axial direction of the cylinder. Mechanisms 7a and 7b feed a pressurized fluid such as pressurized air to spaces 6a and 6b defined between the flanges 4a and 4b and both the ends of the cylinder 5, and have feed pipes 8a and 8b which extend from a pressurized fluid source (not shown) and are connected to the spaces and provided with control valves 9a and 9b which are regulated independently of each other. An opening 11 is provided in the cylinder 5 so that a space 10 between the flanges 4a and 4b in the cylinder is connected to the exterior thereof.

The operation of the device shown in FIG. 2 will be described. When the control valves 9a and 9b are opened, the pressurized fluid such as pressurized air is fed from the pressurized fluid source to the spaces 6a and 6b so that the vibration assembly including the ultrasonic vibrator 1 and the vibration transmitter 2 is floatingly supported. The vibrator 1 is then driven by AC power so that the vibrator generates the ultrasonic vibration corresponding to the frequency of the AC power. The ultrasonic vibration is transmitted to the tool 3 through the ultrasonic vibration transmitter 2 so that the tool performs the ultrasonic machining on a workpiece. At that time, the flanges 4a and 4b provided on the transmitter 2 integrally therewith undergo the ultrasonic vibration, but the friction between the inside surface of the cylinder 5 and the flanges is very low. For that reason, the ultrasonic vibration assembly is freely slidable in the direction of the ultrasonic vibration and freely rotatable about the axis of the assembly, which extends in the direction of the ultrasonic vibration. Even if the resonance frequency of the vibration system changes, since the transmitter 2 is floatingly supported in the cylinder 5 so as to be a resonator having no fixedly supported end, nothing hinders the ultrasonic vibration of the transmitter 2. Therefore, the power of the ultrasonic vibration transmitted by the transmitter does not undergo a loss.

A difference can be set between the pressure of the fluid in the space 6a and that of the fluid in the other space 6b so as not only to support the ultrasonic vibration assembly but also to optionally set the pressure of the ultrasonic machining on the workpiece.

If the amplitude of the ultrasonic vibration of the assembly supported by the device is to be increased in transmitting the vibration to the tool 3, a vibration enlarger 12 is coupled to the bottom of the vibration transmitter 2 coaxially thereto under the bottom of the cylinder 5, as shown in FIG. 3, so that the enlarger transmits the ultrasonic vibration from the transmitter to the tool coupled to the bottom of the enlarger, while increasing the amplitude of the vibration, to cause the tool to perform the ultrasonic vibration of the increased amplitude.

If the vibration enlarger 12 is coupled to the bottom of the vibration transmitter 2 to increase the amplitude of the ultrasonic vibration, as shown in FIG. 3, the length of the ultrasonic vibration assembly is increased and the movability of the assembly at the tool 3, in the direction perpendicular to the vibration, is increased. This is a problem.

SUMMARY OF THE INVENTION

The present invention was made in order to solve the problem. Accordingly, it is an object of the present invention to provide a device for supporting an ultrasonic vibration assembly so that the amplitude of the ultrasonic vibration of the assembly is increased without changing the length of the assembly and without increasing the movability thereof at the tool thereof, in the direction perpendicular to the vibration.

In the device in accordance with the present invention to support the ultrasonic vibration assembly having two flanges and a cylinder, the cross-sectional area of one end portion of the interior of the cylinder is made different from that of the other end portion of the interior, and one of the flanges is made different in outer diameter from the other thereof and fitted in the one end portion.

Since the cross-sectional area of one end portion of the interior of the cylinder of the device provided in accordance with the present invention is made different from that of the other end portion of the interior and one of the flanges of the device is made different in outer diameter from the other thereof and fitted in the one end portion of the interior, the amplitude of the ultrasonic vibration of the assembly in the longitudinal direction thereof is increased without increasing the length of the assembly.

DETAILED DESCRIPTION OF THE INVENTION

Figure 1:
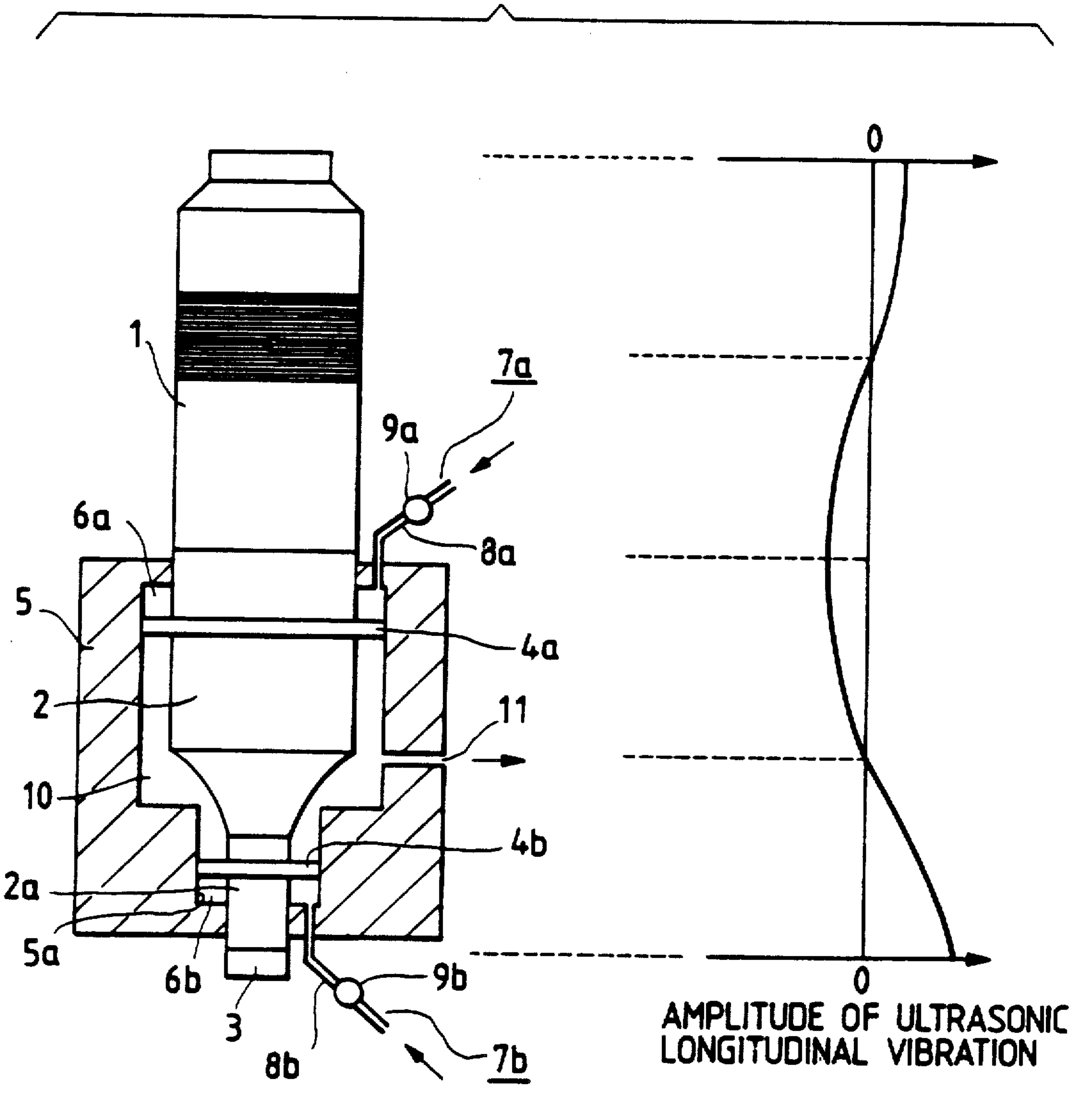
FIG. 1 is a longitudinally sectional view showing a device for supporting an ultrasonic vibration assembly according to an embodiment of the present invention.
Figure 2:
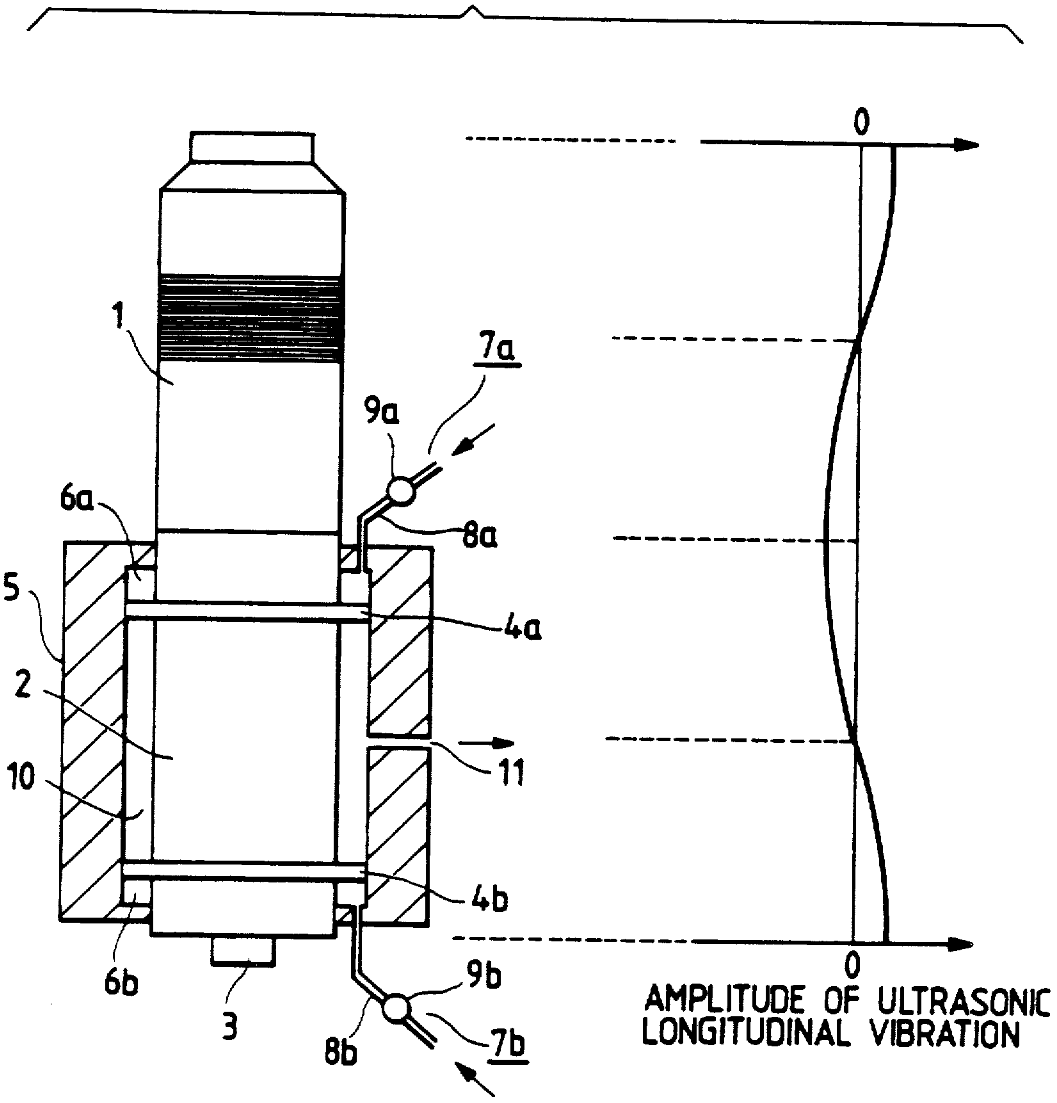
FIG. 2 is a longitudinally sectional view showing a device for supporting an ultrasonic vibration assembly.
Figure 3:
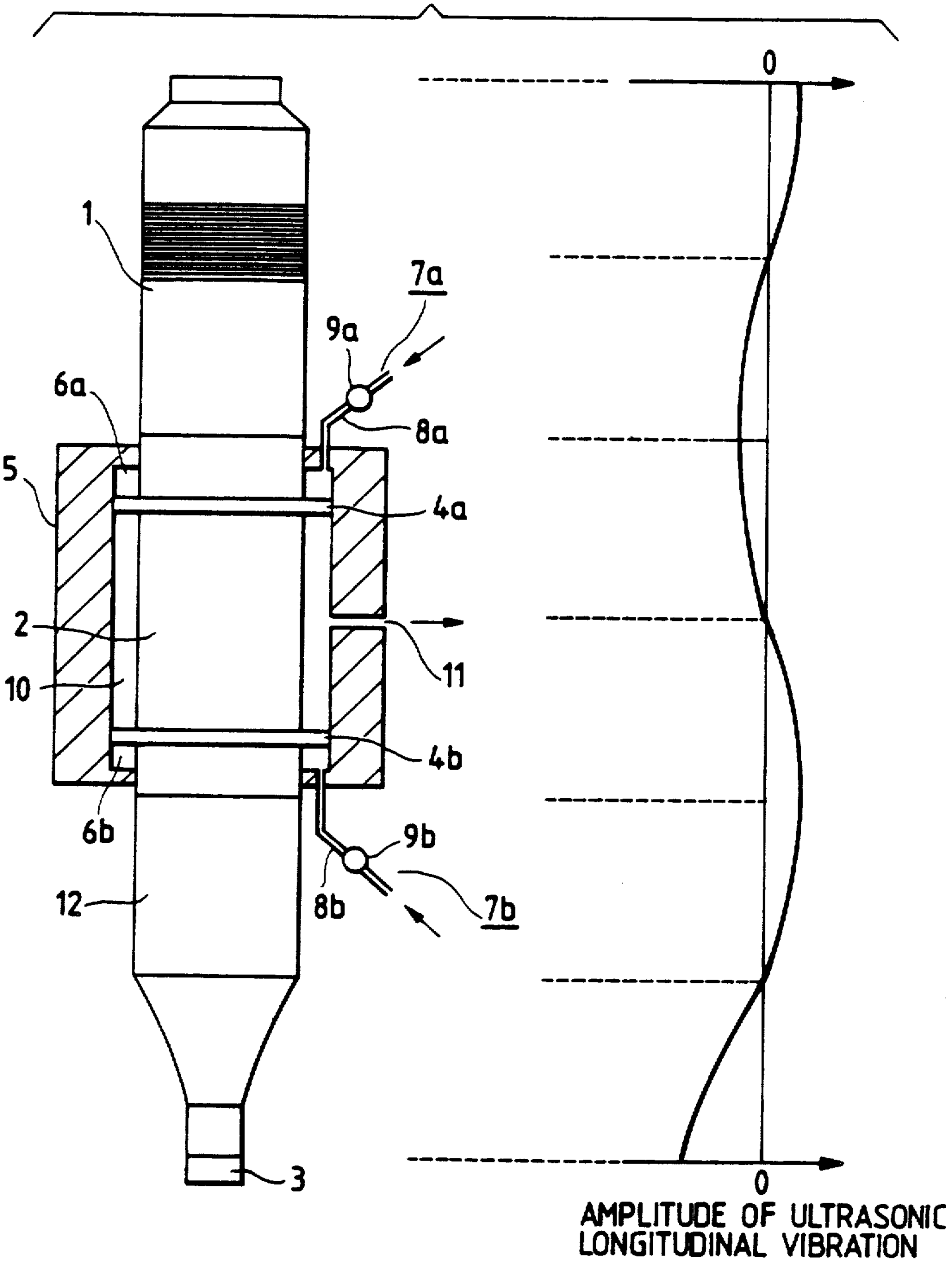
FIG. 3 is a longitudinally sectional view showing the device of FIG. 2 provided with a vibration enlarger.

An embodiment of the present invention will be hereafter described with reference to FIG. 1. The same reference symbols in FIGS. 1, 2 and 3 denote the same or corresponding portions. As shown in FIG. 1, a device for supporting an ultrasonic vibration assembly including an ultrasonic vibrator 1 and ultrasonic vibration transmitter 2, includes a cylinder 5 provided with a small inner diameter portion 5a at the bottom of the cylinder so that the cross-sectional area of the interior of the cylinder is smaller at the bottom thereof than at the intermediate portion and top thereof. The transmitter 2 is provided with a small outer diameter portion 2*a* at the bottom of the transmitter. A lower flange 4*b* smaller in outer diameter than an upper flange 4*a* is provided on the outside circumferential surface of the small outer diameter portion 2*a* integrally therewith and fitted in the small inner diameter portion 5*a* of the cylinder 5 so that the flange is slidable up and down in the axial direction of the cylinder. Except the above-described, the constitution of the device is the same as that of the device shown in FIG. 2.

The operation of the device shown in FIG. 1 will be described. The ultrasonic vibration assembly, in which the vibration transmitter 2 transmits the ultrasonic vibration of the ultrasonic vibrator 1 to a tool 3 for ultrasonic machining, is supported in the same way as the device shown in FIG. 2. That is, the flanges 4*a* and 4*b* provided on the outside circumferential surface of the transmitter 2 integrally therewith are fitted in the cylinder 5 so that the movability of the assembly in the direction perpendicular to that of the ultrasonic vibration is low. The ultrasonic vibration assembly is supported by a pressurized fluid in the spaces 6*a* and 6*b* so that the movability of the assembly in the direction of the ultrasonic vibration is high. Further, according to this embodiment, since the transmitter 2 and the interior of the cylinder 5 are larger in cross-sectional area at the tops thereof than at the bottoms thereof and the upper flange 4*a* is larger in outer diameter than the lower flange 4*b*, the amplitude of the ultrasonic vibration is increased without increasing the length of the ultrasonic vibration assembly.

Although the above-described embodiment is applied to the ultrasonic machining assembly, the present invention is not confined thereto but may be applied to other equipment such as an ultrasonic plastic welder in which the same effect as the embodiment can be obtained.

As described above, in a device provided in accordance with the present invention to support an ultrasonic vibration assembly, two flanges, which function as pistons, are provided on the outside circumferential surface of a vibration transmitter coupled to an ultrasonic vibrator, and a pressurized fluid is fed to spaces defined between the flanges and both the ends of a cylinder. The cross-sectional area of one end portion of the interior of the cylinder is made different from that of the other end portion of the interior. One of the flanges is made different in outer diameter than the other thereof and fitted in the one end portion of the interior of the cylinder. Accordingly, the ultrasonic vibration assembly is floatingly supported to have no fixedly supported end, the position of the flanges is not confined to the node of ultrasonic vibration, the resonance frequency of the assembly is allowed to slightly change due to the change of the vibration system, the movability of the assembly in the direction perpendicular to that of the ultrasonic vibration of the assembly is low, and the amplitude of the vibration is increased without increasing the length of the assembly.

What is claimed is:

1. A device for supporting an ultrasonic vibration assembly, comprising:
   - an ultrasonic vibrator having an end portion and extending along an axis;
   - a vibration transmitter coupled to said end portion of said vibrator coaxially thereto, said vibration transmitter having an outer diameter portion comprising an outside circumferential surface and two ends;
   - two flanges integrally provided on said outside circumferential surface of said transmitter so as to act as pistons, said flanges being spaced apart from each other by a prescribed distance and the outer diameter of one of said flanges being made different than the outer diameter of the other flange;
   - a cylinder, having a sidewall portion and two opposite end portions defining an interior, said flanges being fitted in said cylinder so as to be moveable in the axial direction of said cylinder, a cross-sectional area of one end portion of said interior of said cylinder being made different than the cross-sectional area of the other end portion of said interior; and
   - mechanisms for feeding pressurized fluid to two spaces defined between said flanges and both ends of said cylinder.

2. A device as claimed in claim 1, further comprising a tool for ultrasonic machining, said tool being coupled to an end of said vibration transmitter.

3. A device as claimed in claim 2, wherein an outer diameter of one of said flanges near said tool is smaller than the outer diameter of the other of said flanges.

4. A device as claimed in claim 2, wherein a cross-sectional area of one end of the interior of said cylinder near said tool is smaller than the cross-sectional area of the other end of said interior.

5. A device as claimed in claim 1, wherein said mechanisms include feed pipes and control valves, said feed pipes being controlled independently from each other.

6. A device as claimed in claim 1, wherein said cylinder has an opening at the center of said sidewall portion thereof.

7. A device as claimed in claim 1, wherein one of said ends of said outer diameter portion of said vibration transmitter has a smaller outer diameter then the other of said ends of said said outer diameter portion of said vibration transmitter.

8. A device as claimed in claim 1, wherein said flanges are provided at any position along said vibration transmitter.

9. A device as claimed in claim 1, wherein said flanges are provided at any position along said vibration transmitter except for nodes of ultrasonic vibration.

10. A device for supporting an ultrasonic vibration assembly, comprising:
    - an ultrasonic vibrator having an end portion and extending along an axis;
    - a vibration transmitter coupled to said end portion of said vibrator coaxially thereto, said vibration transmitter having an outer diameter portion, comprising an outside circumferential surface and two ends, wherein one of said ends of said outer diameter portion of said vibration transmitter has a smaller outer diameter then the other of said ends of said said outer diameter portion of said vibration transmitter;
    - a tool for ultrasonic machining connected to said end of said smaller outer diameter portion of said vibration transmitter;
    - two flanges provided integrally on said outside circumferential surface of said transmitter so as to act as pistons; an outer diameter of one of said flanges near said tool being smaller then the outer diameter of the other of said flanges;
    - a cylinder, having a sidewall portion and two opposite end portions defining an interior, said flanges being fitted in said cylinder so as to be moveable in the axial direction of said cylinder, said cylinder having an opening at the center of said sidewall portion thereof and having a small inner diameter portion in said interior of said cylinder near said tool, said smaller of said flanges being fitted in said small inner diameter portion; and mechanisms for feeding a pressurized fluid to two spaces defined between said flanges and both ends of said cylinder, said mechanism including feed pipes and control valves.

* * * * *